(12) United States Patent
Kim

(10) Patent No.: US 7,248,597 B2
(45) Date of Patent: Jul. 24, 2007

(54) GENERAL PURPOSE INPUT/OUTPUT CONTROLLER

(75) Inventor: Jason Seung-Min Kim, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1309 days.

(21) Appl. No.: 09/847,963

(22) Filed: May 2, 2001

(65) Prior Publication Data

US 2002/0163924 A1 Nov. 7, 2002

(51) Int. Cl.
| | |
|---|---|
| H04L 12/28 | (2006.01) |
| G06F 3/00 | (2006.01) |
| G06F 7/38 | (2006.01) |
| H03K 19/173 | (2006.01) |

(52) U.S. Cl. .................. 370/419; 370/463; 326/38; 326/62; 710/8; 710/62

(58) Field of Classification Search .............. 370/419, 370/463; 326/38, 62; 710/8, 62
See application file for complete search history.

(56) References Cited

U.S. PATENT DOCUMENTS

| | | | | |
|---|---|---|---|---|
| 5,053,646 A | * | 10/1991 | Higuchi et al. .............. 326/40 |
| 5,289,580 A | * | 2/1994 | Latif et al. .................... 710/63 |
| 5,457,784 A | * | 10/1995 | Wells et al. .................... 710/9 |
| 5,548,782 A | * | 8/1996 | Michael et al. ............... 710/15 |
| 5,671,355 A | * | 9/1997 | Collins ....................... 709/250 |
| 5,826,105 A | * | 10/1998 | Burstein et al. ............. 710/22 |
| 5,832,244 A | * | 11/1998 | Jolley et al. ............... 710/305 |
| 5,832,291 A | * | 11/1998 | Rosen et al. ................ 712/11 |
| 5,991,830 A | * | 11/1999 | Beard et al. ................. 710/18 |
| 6,016,523 A | * | 1/2000 | Zimmerman et al. ........ 710/63 |
| 6,154,788 A | * | 11/2000 | Robinson et al. ............. 710/8 |
| 6,286,060 B1 | * | 9/2001 | DiGiorgio et al. ........... 710/31 |
| 6,442,625 B1 | * | 8/2002 | Robinson et al. ............. 710/8 |
| 6,499,069 B1 | * | 12/2002 | Shimura ...................... 710/62 |
| 6,640,262 B1 | * | 10/2003 | Uppunda et al. ............ 710/10 |
| 6,687,758 B2 | * | 2/2004 | Craft et al. ................ 709/250 |
| 6,694,385 B1 | * | 2/2004 | Fuoco et al. .................. 710/8 |

* cited by examiner

Primary Examiner—Alpus H. Hsu

(57) ABSTRACT

The present invention permits an I/O port to be used with a variety of different I/O devices, regardless of their device type implementation, such as tri-state I/O devices, pull-up I/O devices, or pull-down I/O devices. Thus, one set of pins may be used for various different I/O devices.

26 Claims, 4 Drawing Sheets

| CFG-REG NAME | ADDRESS | TYPE | SIZE | DESCRIPTION | 7 6 5 4 3 2 1 0 |
|---|---|---|---|---|---|
| *GPIO Controller* | | | | | |
| GPIO CNF | CF00:0000 | R/W | 8b | GPIO/SPIO selection | PORT-A.ENB |
| GPIO OE | CF00:0010 | R/W | 8b | GPIO Output Enable | PORT-A.OE |
| GPIO OUT.REG | CF00:0020 | R/W | 8b | GPIO Output Port Register | PORT-A.OUT |
| GPIO IN.REG | CF00:0030 | R/O | 8b | GPIO Input Port Register | PORT-A.IN |
| GPIO INT.STA | CF00:0040 | R/O | 8b | GPIO Interrupt Status Register | PORT-A.INT.STA |
| GPIO INT.ENB | CF00:0050 | R/W | 8b | GPIO Interrupt Enable Register | PORT-A.INT.ENB |
| GPIO INT.LVL | CF00:0060 | R/W | 8b | GPIO Interrupt Activation Level | PORT-A.INT.LVL |
| GPIO INT.CLR | CF00:0070 | clr | 8b | GPIO Interrupt Flag Set-to-Clear | PORT-A.INT.CLR |

*Figure 4*

GENERAL PURPOSE INPUT/OUTPUT CONTROLLER

The present invention relates to computer system architecture, and more specifically, to a configurable input/output interface port.

BACKGROUND OF THE INVENTION

The miniaturization of complex electronic devices has resulted in a wide variety of portable devices. For example, televisions, DVD viewers/players, computers, MP3 players, and the like have all become miniaturized to the point where it is cost effective to implement these technologies as portable devices. Due to the miniaturization of these devices, the functionality of the hardware driving such devices is often implemented on a single ASIC unit that performs the functions necessary to operate as the particular device. Unfortunately, due to the miniaturization of the devices and because the ASIC units often incorporate numerous functional components, the number of available pins on the ASIC is limited. With respect to input/output (I/O) pins, there may be only one or two I/O pins, which generally precludes different I/O devices from interfacing with the portable device. This disadvantage can limit the acceptance of a particular device in the commercial market. Thus, it is desirable to provide such a device having an I/O port that can be used with any I/O device, regardless of its device type implementation, for example, input, output or bidirectional—open drain, open collector, totem pole, or tri-state types. It is to this end that the present invention is directed.

SUMMARY OF THE INVENTION

The present invention permits an I/O port to be used with a variety of different I/O devices, regardless of their device type implementation, such as tri-state I/O devices, pull-up I/O devices, or pull-down I/O devices, either as interruptable or non-interruptable. Thus, one set of pins may be used for various different I/O devices.

In an aspect, the invention affords an electronic device having a configurable port for connecting with a variety of interface device types. The device comprises a register for storing one or more sets of configuration data, each set of configuration data corresponding to a particular device type that may be connected to the electronic device, and a multiplexer for conforming a data signal in accordance with the configuration data associated with a particular interface device type connected to the electronic device. Interface device types may include any of open drain interface type, open collector interface type, totem pole interface type, and tri-state buffer interface type. The device also comprises an inbound buffer for buffering an input data signal from a device connected with the port, and an outbound buffer for buffering an output signal that conforms with an interface type of the device connected with the port. The device also comprises an interruptable inbound buffer, which is capable of individually enabling and/or disabling processor interrupts based on the individual of activity level—either high state or low state.

One or more load-enabled flip-flops, preferably implemented as D-type flip-flops may be used as respective programmable registers. The load-enabled flip-flops include a first set of flip-flops for configuring and enabling signaling for the configurable port of the electronic device, and a second set of flip-flops for controlling input and output signaling for the configurable port.

A controller preferably controls the operation of the configurable port, and may be associated with a register set for controlling the operation of the configurable port. The register set includes a first register for indicating whether the port is configured as a general purpose interface port or as a special purpose interface port to support a particular device connected with the port, a second register for configuring the port to transmit an output signal to the device connected with the port, a third register for indicating data representing the output signal to be transmitted to the device connected with the port, and a fourth register for indicating data representing an input signal that is received from the device connected with the port. The register set further includes a fifth register for indicating the status of the controller, a sixth register for indicating whether to enable an interrupt signal to interrupt a host processor, a seventh register for indicating an interrupt activation level, and an eighth register for clearing the contents of the fifth register. Preferably, these registers are 8 bit registers.

In another aspect, the invention affords a method for configuring a port to connect with a variety of interface device types. The method comprises the steps of storing one or more sets of configuration data relating to the variety of interface device types that may be connected to the electronic device, each set of configuration data corresponding to a particular device type, configuring the port to interface with a particular one of the variety of interface device types, and in response to enabling the port to transmit data to the connected device, conforming an output data signal in accordance with the configuration data associated with the particular interface device type connected to the electronic device, and in response to enabling the port to receive data from the connected device, receiving an input data signal and translating the input data signal as appropriate to interface with the port. The method also includes the steps of buffering the input data signal from the device connected with the port in response to receiving the input data signal, and buffering the output signal that conforms with an interface type of the device connected with the port in response to transmitting the output signal to the device connected with the port.

The interface device types preferably include any of open drain interface type, open collector interface type, totem pole interface type, and tri-state buffer interface type. The configuring step includes the steps of configuring and enabling signaling for the configurable port of the electronic device, and controlling input and output signaling for the configurable port, and further includes providing a register set for controlling the operation of the configurable port, wherein the register set includes a first register for indicating whether the port is configured as a general purpose interface port or as a special purpose interface port to support a particular device connected with the port, a second register for configuring the port to transmit an output signal to the device connected with the port, a third register for indicating data representing the output signal to be transmitted to the device connected with the port, and a fourth register for indicating data representing an input signal that is received from the device connected with the port, and a fifth register for indicating the status of the controller, a sixth register for indicating whether to enable an interrupt signal to interrupt a host processor, a seventh register for indicating an interrupt activation level, and an eighth register for clearing the contents of the fifth register.

BRIEF DESCRIPTION OF THE DRAWINGS

FIG. 4 depicts an exemplary configuration register set in accordance with the invention that enables the I/O port 54 to be configured for a particular device type.

DETAILED DESCRIPTION OF THE PREFERRED EMBODIMENT

While the following description is in the context of an I/O controller in a portable MP3 music player, those skilled in the art recognize that the invention has greater utility and is applicable to any computer system that needs to reduce its pin count. For example, integrated circuits, I/O ports, independent hardware devices, and the like can all utilize the invention to reduce their pin counts. The following description is merely representative of a preferred embodiment of the invention and is not intended to be limiting.

Figure 1:
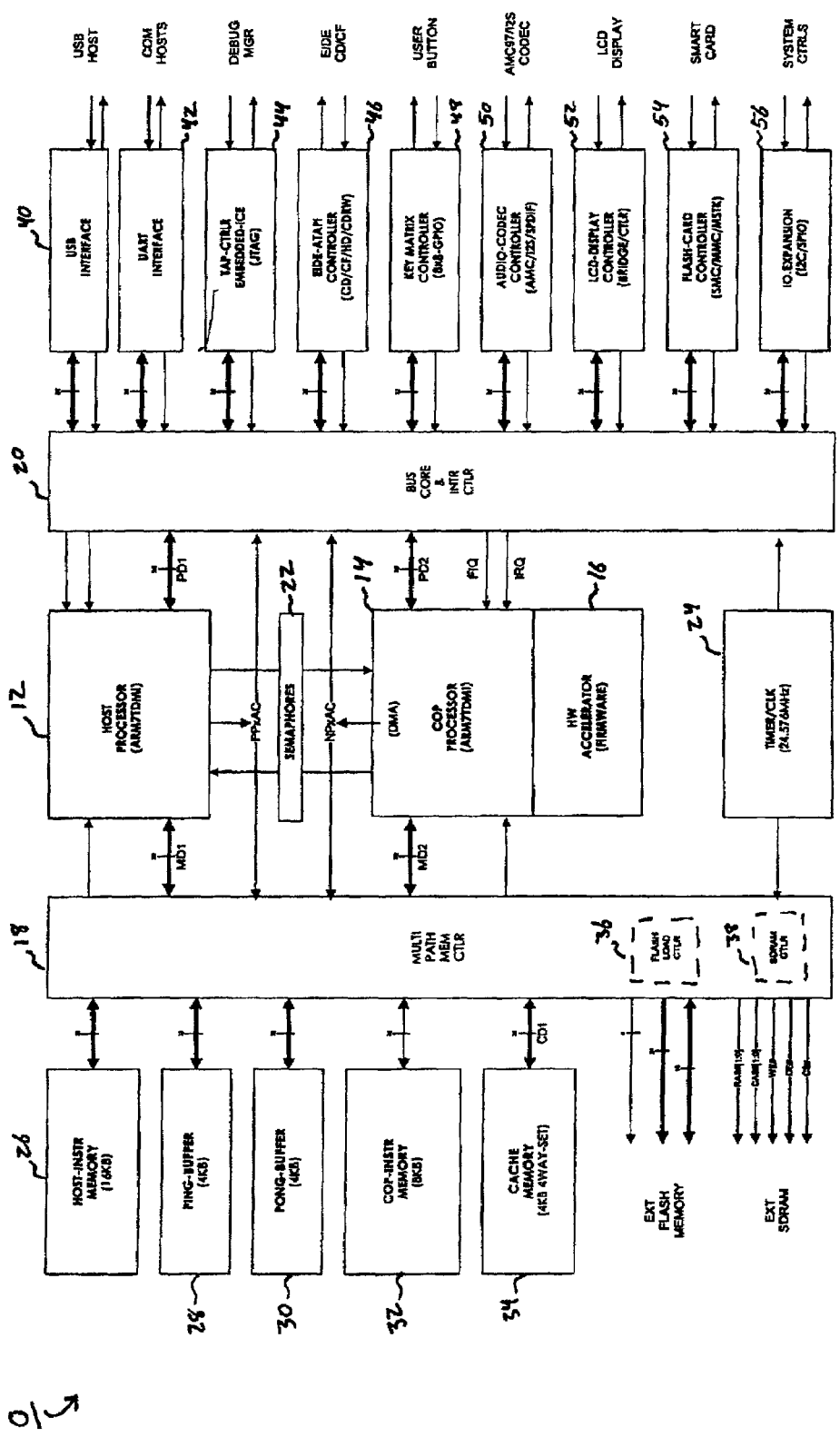
FIG. 1 is a block diagram illustrating an exemplary embodiment of a multi-processor system built in an ASIC unit with which the invention may be utilized.

FIG. 1 is a block diagram illustrating an exemplary embodiment of a multi-processor system 10 built in an ASIC unit with which the invention may be utilized, The multi-processor system 10 is described in more detail in Applicant's U.S. patent application Ser. No. 09/847,967, entitled "MULTIPROCESSOR COMMUNICATION SYSTEM AND METHOD", which was filed on May 2, 2001 from which U.S. Pat. No. 6938,253 issued on Aug. 30, 2005, and which is incorporated herein by reference in its entirety. The system 10 is briefly described below.

As shown in FIG. 1, the system 10 may include a host processor 12 which may preferably be a reduced instruction set (RISC) ARM core, such as is manufactured by ARM, Inc., and a coprocessor core 14 that operate in a cooperative manner to complete various system tasks. The system 10 may also include a hardware accelerator engine 16. The host processor 12, the coprocessor 14, and the hardware accelerator engine 16 may all be connected to a multipath memory controller 18 and a multipath peripheral controller 20. To control access to the shared resources connected to the multipath memory controller 18 and the multipath peripheral controller 20, the system 10 may include a semaphore unit 22 which permits the two processors 12, 14 to communicate with each other and control the access to the shared resources. The semaphore unit 22 permits the processors to negotiate for the access to the shared resources, but then, due to the multipath controllers 18, 20, permits the processors to access the resources over its own bus that is part of the controllers 18, 20. To control the timing of the controllers 18, 20, a timer/clock 24 may be connected to each controller 18, 20.

Both the memory controller 18 and the peripheral controller 20 are then in turn connected to one or more resources that are shared by the processors 12, 14. For example, the memory controller 18 may be connected to a host instruction memory 26 that is typically accessed by the host processor 12, a ping buffer 28, a pong buffer 30, and a coprocessor instruction memory 32 which is typically accessed by the coprocessor 14. The host processor 12 may always have priority access to its instruction memory 26 and the coprocessor may always have priority access to its instruction memory 32 since the two processors 12, 14 each have separate buses connected to each resource. The memory controller 18 may also be connected to a cache memory 34, such as a 4-way 4 KB set associated cache, a flash memory interface 36 for connecting to an external flash memory (not shown) and an external synchronous dynamic random access memory (SDRAM) interface 38 with the various necessary signals, such as RAS, CAS, WE, OE, and CS, to interface to a typical SDRAM.

The peripheral multipath controller 20, which operates in a manner similar to the memory controller 18, in that each processor 12, 14 may access different shared resources simultaneously, may have one or more peripherals connected to it. For example, the peripheral controller 20 may be connected to a universal serial bus (USB) interface 40 that in turn may connect to a USB device or host, a universal asynchronous receiver/transmitter (UART) interface 42 that in turn may connect to communication port (COM) hosts, a TAP/embedded ICE controller 44, an EIDE-CD/CF controller 46 to interface to hard disk drives or CD drives, a key matrix controller 46 that connects to a user input keyboard, an audio codec controller 48 that connects to an audio coder/decoder (codec), a liquid crystal display (LCD) controller 50 that connects to a LCD display, a smartcard controller 52 for connecting to a smart card, and an input/output (I/O) expansion port 54 (which will be described in more detail below) that connects to one or more different input/output devices. As with the memory controller 18, the peripheral controller 20 provides access for each processor 12, 14 to each shared resource.

The above system is preferably embodied as an ASIC unit for performing the functions described above. Such a system provides a unique portable electronic device that offers many advantages over conventional devices, which are discussed in detail in the above-identified patent application. However, since the device is portable, its primary functional unit is miniaturized to the point where the number of available pins, especially I/O pins, is limited. Often it is desirable to utilize a number of different I/O devices with the above system. These I/O devices can be individually implemented in accordance with very different architectural interfaces, such as open drain/collector, totem pole, or three state interface types. When the number of available pins were large, it was common to associate particular I/O pins for each of these device interface types. However, when the number of pins is limited, it is desirable to support these devices using the available allocated pins. Thus, it is desirable to create a general purpose I/O port that is configurable depending on the associated interface type.

Figure 2:
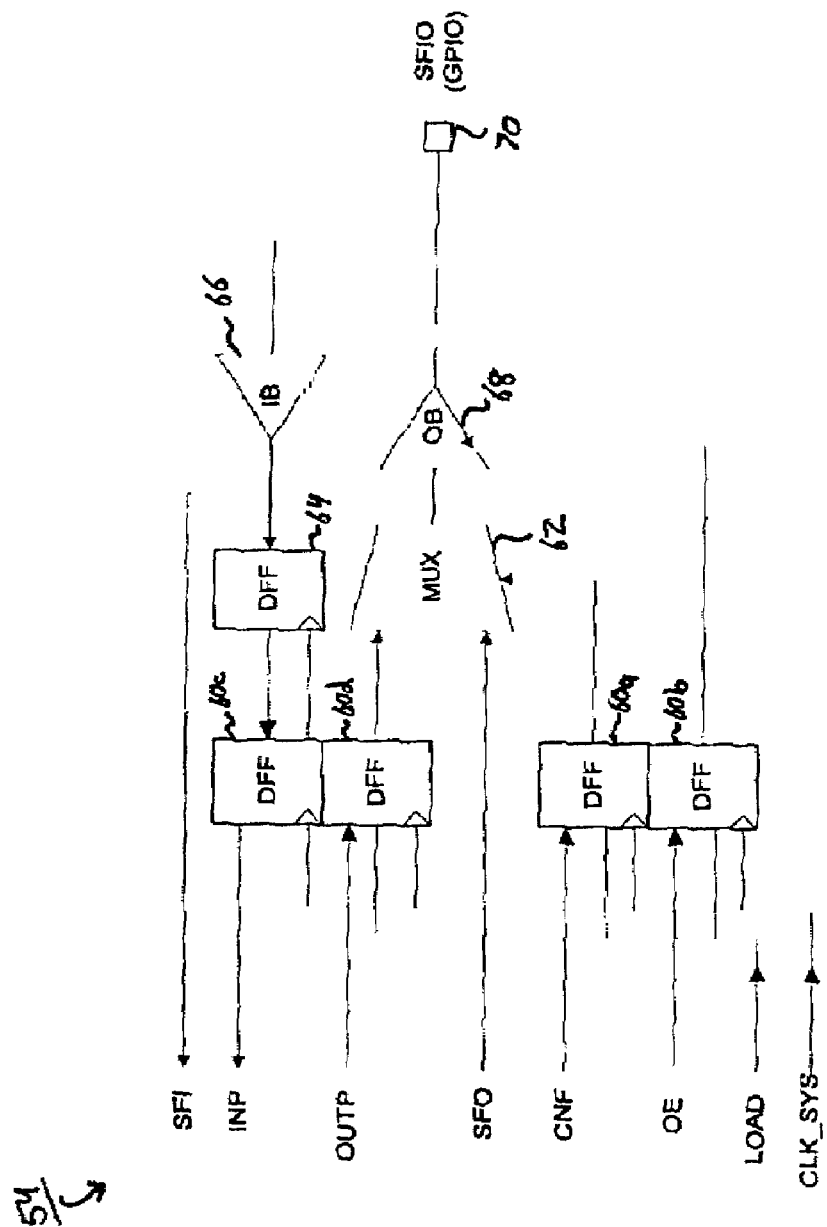
FIG. 2 is a diagram illustrating, in more detail, the I/O port shown in FIG. 1.

FIG. 2 is a diagram illustrating, in more detail, the input/output (I/O) expansion port 54 shown in FIG. 1. In an exemplary embodiment, the input/output expansion port 54 comprises one or more load-enabled flip flops 60, which are preferably implemented as D-type flip flops, a multiplexer 62, one or more additional flip-flops 64, and inbound and outbound buffers 66, 68. The expansion port 54 may be utilized as a general purpose I/O port or as a multiplexed (or special function) I/O port both which will be described in more detail below.

The load-enabled flip flops 60 each have, in addition to a clock (CLK) signal input, a data signal input, and a second input (LOAD) that functions as a "chip select" to enable or disable updating of the particular flip-flop 60 so that the flip flop 60 may be used as a programmable register. The CLK signal may be generated from a system clock located in the computer system that is preferably responsible for generating the synchronization timings within the system.

A first set of flip-flops 60*a*, 60*b* may be associated with configuring and enabling signaling for the I/O port 54. Flip-flop 60*a* may receive an Outbound Enable (OE) data signal from an I/O controller (not shown) that interfaces with the I/O port 54. The OE data signal may be passed to the outbound buffer 68 when the flip-flop 60*a* is enabled (i.e., when the LOAD signal and the CLK signal are enabled). The OE signal enables the outbound buffer 68 to pass an output data signal to an SFIO/GPIO pad 70.

The signal received by the outbound buffer 68 is determined by a multi-input multiplexer 62. In the drawing shown in FIG. 2, the multiplexer 62 is a three-input multiplexer; however, those skilled in the art will recognize that the multiplexer may receive a different number of inputs without departing from the invention. In the exemplary embodiment shown in FIG. 2, one such input to the multiplexer 62 is the Output (OUTP) data signal that is provided from the I/O controller. Similar to the first set of flip-flops 60*a*, 60*b*, a second set of flip-flops 60*c*, 60*d* may be associated with input and output signaling for the I/O port 54. The OUTP data signal may be passed to the multiplexer 62 via flip-flop 60*c* (i.e., when the LOAD signal and the CLK signal are enabled).

Figure 3A:
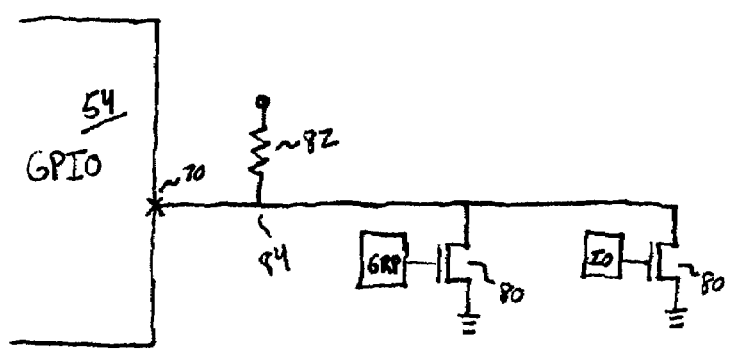
FIGS. 3A–3D illustrate some examples of various I/O interface device type implementations that may be connected to the I/O port of the invention.
Figure 3B:
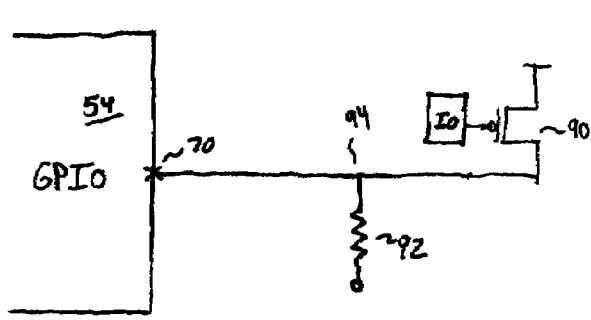
Figure 3C:
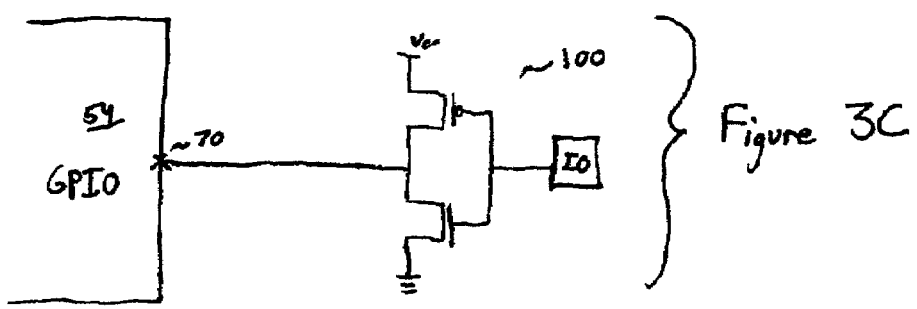
Figure 3D:
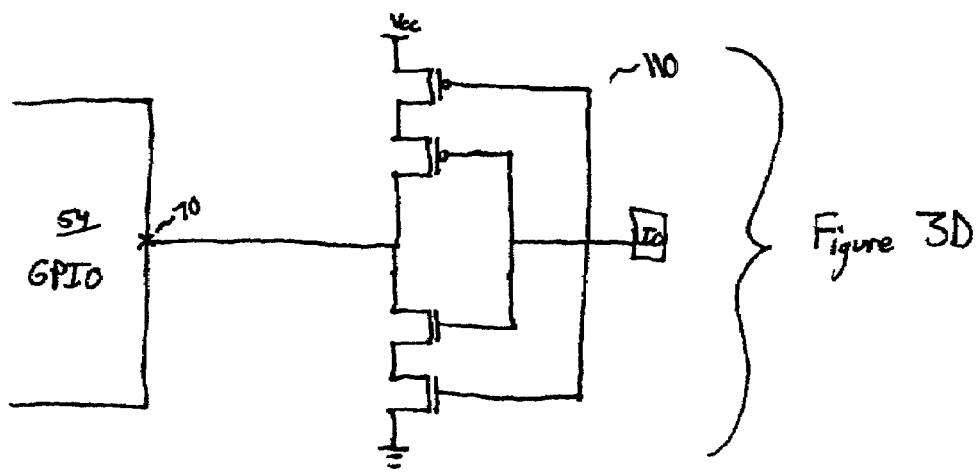

Another input to the multiplexer 62 is the Special Function Output (SFO) data signal. In accordance with the invention, the I/O port may be configured for a particular I/O interface device type. I/O interface device types are often implemented using a variety of different architectures. FIGS. 3A–3D illustrate some examples of various I/O interface device type implementations. In FIG. 3A, an open drain type I/O interface type is illustrated. As shown in FIG. 3A, an open drain type output buffer 80 may be connected with the GPIO pin 70 (FIG. 2) of the I/O port 54. The output buffer 80 may be embodied as an N-channel transistor having an open drain, and a pull-up resistor 82 may be coupled with the common drain-pin connection 84 if needed as is well known in the art. In FIG. 3B, an open collector type I/O interface type is illustrated. As shown in FIG. 3B, an open collector output buffer 90 may be connected with the GPIO pin 70 (FIG. 2) of the I/O port 54. The output buffer 90 may be embodied as a P-channel transistor having an open collector, and a pull-down resistor 92 may be coupled with the common collector-pin connection 94 if needed as is well known in the art. A totem pole type output buffer 100 is shown in FIG. 3C connected with the GPIO pin 70 (FIG. 2) of the I/O port 54. The output buffer 100 may be embodied as stacked transistors of the complementary type (i.e., stacked PMOS transistors connected with stacked NMOS transistors) as is well known in the art. FIG. 3D illustrates a tri-state output buffer 110 that is connected with the GPIO pin 70 (FIG. 2) of the I/O port 54. The output buffer 110 may be embodied as stacked complementary transistors (i.e., stacked PMOS transistors connected with stacked NMOS transistors) as is well known in the art. The tri-state buffer 110 functions similar to an electrical switch allowing its load to be selectively switched off the bus when needed.

Returning to FIG. 2, a configuration register (not shown) may be configured appropriately to enable the I/O port 54 to emulate a particular I/O interface to support the attached device type. FIG. 4 depicts an exemplary configuration register set in accordance with the invention that enables the individual I/O port 54 bits 70 to be configured for a particular device type. While a single register set is shown in FIG. 4, the number of register sets implemented in the system can be changed depending on the number of different ports to support. For example, if four different sets of configurations are needed, register sets A–D may be utilized to emulate particular sets of device type interfaces (such as those shown in FIG. 3). However, those skilled in the art will recognize that additional configurations are possible and the above is merely exemplary. Preferably, each configuration register is a 32 bit read/write register, and each configuration register may be associated with a particular I/O device type interface. For example, configuration register A may be associated with an open drain type I/O interface, configuration register B may be associated with an open collector type I/O interface, configuration register C may be associated with a totem pole type I/O interface, while configuration register D may be associated with a tri-state I/O interface.

The following description of the register sets is made with respect to a single configuration register set. However, this description is applicable to other register sets in the system. In the exemplary illustration of FIG. 4, a first register 120 (GPIO/SPIO selection) may be utilized to indicate whether the port is to be configured as a general purpose interface port or a special purpose interface port to support a particular device. Another register 122 (GPIO Output Enable) may be utilized to configure the port 54 to transmit an output I/O signal to the GPIO pad 70. Another register 124 (GPIO Output Port) may indicate data representing output I/O data to be transmitted to a connected I/O device via the port 54. A fourth register (GPIO Input Port) 126 may indicate data representing input I/O data that is received from a connected I/O device via the port 54.

Remaining registers in the register set may include a register 128 (GPIO Interrupt Status) for indicating the status of the GPIO controller (i.e., configuration and receiving/transmitting signals from/to a connected I/O device). The register set may also include a register 130 (GPIO Interrupt Enable) for indicating whether to enable an interrupt signal to interrupt the host processor to cause the host processor to respond by servicing the interrupt. This technique is well known. Another register 132 (GPIO Interrupt Activation Level) may also be included to configure the GPIO to selectively interrupt the processor based on the polarity of the active signal. For example, when the GPIO is used to detect Active-Low CS# or INTR#, the GPIO controller may be configured to interrupt the processor when the I/O signal changes to LOW. Likewise, when the GPIO controller is used as a Rising Edge Clock to sample serial data, the GPIO controller may be configured to interrupt the processor when the I/O signal changes from Low to High and the GPIO Data line may be read to latch the data on the clock edge. The register set may also include a register 134 (GPIO Interrupt Flag Set-to-Clear) for clearing the interrupt status register 128 after the host processor has been interrupted and services the interrupt. Other registers may be provided and the above are merely exemplary.

As discussed above, the port 54 may be configured depending on the I/O interface type of a connected device. The configuration information for various device interface types (i.e., open drain/collector type, totem pole type, tri-state buffer type) may be maintained in a configuration register, and depending on the desired port configuration, the register data may be utilized to configure the port 54 appropriately. Output data can be multiplexed with the configuration data to configure a resulting output data signal in accordance with the configuration data for the particular I/O device type. For example, in the case where a connected I/O device incorporates an open collector type interface design, the configuration data may be retrieved from the configuration register for the open collector type interface and the output data may be multiplexed with the open collector type configuration data to conform a resulting output data signal that can be transmitted to and recognized by the connected I/O device. Thus, the I/O port 54 can emulate a particular I/O interface to support the attached device type.

The I/O port 54 is also capable of receiving input data signals from an I/O device that is connected with the I/O port 54. Accordingly, an input data signal is received via the GPIO pin 70 and is passed to the input buffer 66 (the output buffer 68 is not enabled). The input buffer 66 passes the input data signal to a first flip-flop 64 (preferably a D-type flip-flop) that passes the input signal (when the CLK signal is enabled) to another flip-flop 60*d* which passes the input data signal (INP) to the I/O controller for processing. Similarly, the input data signal from the input buffer 66 is also provided as a Special Function Input (SFI) data signal to the I/O controller for processing the data signal depending on the configuration of the I/O port 54.

As described above, the input data signals are protected by metastable protection registers, for example, embodied as back-to-back D-type flip-flops (i.e., flip-flops 64, 60*d*), and the output data signals are registered. However, special function inputs and outputs are preferably provided without such synchronization protections to allow simple pass-through operations. This allows the GPIO pin to be used as either a synchronous input or an asynchronous input. Synchronous inputs typically introduce one or more clock delays, whereas asynchronous inputs typically provide a direct propagation path. Consequently, the special function input and output signals are synchronized and metastable protected at Special Function Blocks. For example, in the embodiment shown, interrupt decision logic (registers 128 through 130) are implemented for each individual pin. For other pins, pin mixing circuits (not shown) may be used to allow other functions such as UART and I2C interfaces.

What is claimed is:

1. An electronic device having a configurable port for connecting with a variety of interface device types, comprising:
a register for storing one or more sets of configuration data each set of configuration data corresponding to a particular interface device type that may be connected to the electronic device; and
a multiplexer for conforming a data signal in accordance with the configuration data associated with a particular interface device type connected to the electronic device, wherein
a controller controls the operation of the configurable port, the controller being associated with a register set for controlling the operation of the configurable port, and wherein
the register set includes a first register for indicating whether the port is configured as a general purpose interface port or as a special purpose interface port to support a particular device connected with the port, a second register for configuring the port to transmit an output signal to the device connected with the port, a third register for indicating data representing the output signal to be transmitted to the device connected with the port, and a fourth register for indicating data representing an input signal that is received from the device connected with the port.

2. The electronic device of claim 1, wherein the register set further includes a fifth register for indicating the status of the controller, a sixth register for indicating whether to enable an interrupt signal to interrupt a host processor, a seventh register for indicating an interrupt activation level, and an eighth register for clearing the contents of the fifth register.

3. The electronic device of claim 1, wherein the register set includes one or more 8 bit registers.

4. The electronic device of claim 1, further comprising an inbound buffer for buffering an input data signal from a device connected with the port, and an outbound buffer for buffering an output signal that conforms with an interface type of the device connected with the port.

5. The electronic device of claim 1, further comprising an interruptible inbound buffer capable of individually enabling and disabling processor interrupts based on individual activity levels.

6. The electronic device of claim 5, wherein the activity level is a high state activity level.

7. The electronic device of claim 5, wherein the activity level is a low state activity level.

8. The electronic device of claim 1, wherein the interface device types include any of open drain interface type, open collector interface type, totem pole interface type, tri-state buffer interface type, and input types capable of being configured to detect active levels or edges.

9. The electronic device of claim 1, wherein the data signal is an output data signal.

10. The electronic device of claim 1, further comprising one or more load-enabled flip-flops for use as respective programmable registers.

11. The electronic device of claim 10, wherein the flip-flops are implemented as D-type flip-flops.

12. The electronic device of claim 10, wherein the load-enabled flip-flops include a first set of flip-flops for configuring and enabling signaling for the configurable port of the electronic device, and a second set of flip-flops for controlling input and output signaling for the configurable port.

13. An electronic device having a configurable port for connecting with a variety of interface device types, comprising:
means for storing one or more sets of configuration data each set of configuration data corresponding to a particular interface device type that may be connected to the electronic device; and
means for conforming a data signal in accordance with the configuration data associated with a particular interface device type connected to the electronic device, wherein a controller controls the operation of the configurable port, the controller being associated with a means for controlling the operation of the configurable port, and wherein the controlling means includes
a means for indicating whether the port is configured as a general purpose interface port or as a special purpose interface port to support a particular device connected with the port,
a means for configuring the port to transmit an output signal to the device connected with the port,
a means for indicating data representing the output signal to be transmitted to the device connected with the port, and
a means for indicating data representing an input signal that is received from the device connected with the port.

14. The electronic device of claim 13, wherein the controlling means further includes a means for indicating the status of the controller, a means for indicating whether to enable an interrupt signal to interrupt a host processor, and a means for indicating an interrupt activation level.

15. The electronic device of claim 13, further comprising a first buffering means for buffering an input data signal from a device connected with the port, and a second buffering means for buffering an output signal that conforms with an interface type of the device connected with the port.

16. The electronic device of claim 13, further comprising an interruptible buffering means for individually enabling and disabling processor interrupts based on individual activity level.

17. The electronic device of claim 16, wherein the activity level is a high state activity level.

18. The electronic device of claim 16, wherein the activity level is a low state activity level.

19. The electronic device of claim 13, wherein the interface device types include any of open drain interface type, open collector interface type, totem pole interface type, and three state buffer interface type.

20. The electronic device of claim 13, wherein the data signal is an output signal.

21. The electronic device of claim 13, further comprising programmable register means for configuring the port in accordance with a particular interface device type.

22. The electronic device of claim 21, wherein the programmable register means includes a means for configuring and enabling signaling for the configurable port of the electronic device, and a means for controlling input and output signaling for the configurable port.

23. A method for configuring a port to connect with a variety of interface device types, comprising the steps of:
storing one or more sets of configuration data relating to the variety of interface device types that may be connected to an electronic device, each set of configuration data corresponding to a particular interface device type;
configuring the port to interface with a particular one of the variety of interface device types including the steps of configuring and enabling signaling for the configurable port of the electronic device, and controlling input and output signaling for the configurable port;
in response to enabling the port to transmit data to the connected device, conforming an output data signal in accordance with the configuration data associated with the particular interface device type connected to the electronic device; and
in response to enabling the port to receive data from the connected device, receiving an input data signal and translating the input data signal in accordance with the configuration data associated with the particular interface device type connected to the electronic device,
wherein the configuring step further includes providing a register set for controlling the operation of the configurable port, wherein the register set includes a first register for indicating whether the port is configured as a general purpose interface port or as a special purpose interface port to support a particular device connected with the port, a second register for configuring the port to transmit an output signal to the device connected with the port, a third register for indicating data representing the output signal to be transmitted to the device connected with the port, and a fourth register for indicating data representing an input signal that is received from the device connected with the port.

24. The method of claim 23, wherein the register set further includes a fifth register for indicating the status of the controller, a sixth register for indicating whether to enable an interrupt signal to interrupt a host processor, a seventh register for indicating an interrupt activation level, and an eighth register for clearing the contents of the fifth register.

25. The method of claim 23, further comprising the steps of buffering the input data signal from the device connected with the port in response to receiving the input data signal, and buffering the output signal that conforms with an interface type of the device connected with the port in response to transmitting the output signal to the device connected with the port.

26. The method of claim 23, wherein the interface device types include any of open drain interface type, open collector interface type, totem pole interface type, and three state buffer interface type.

* * * * *